(No Model.)
W. S. HARMON.
ANTI FRICTION BEARING FOR ROLLER SKATES.
No. 320,554. Patented June 23, 1885.
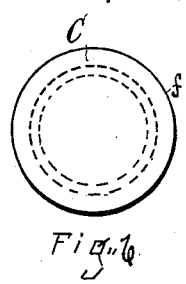
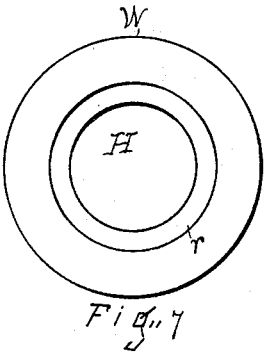
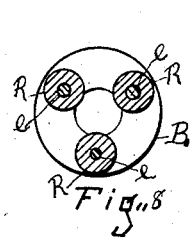
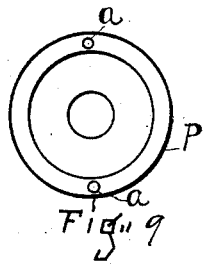
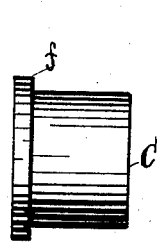
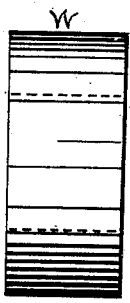
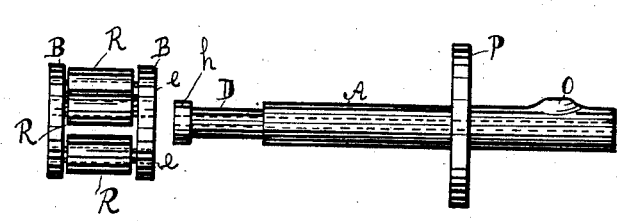
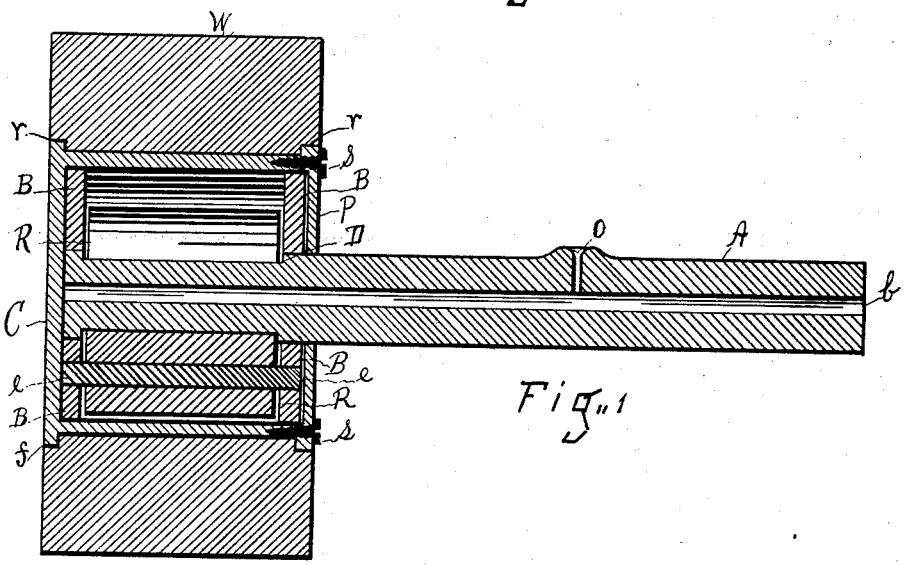
Witnesses:
Jno. G. Doyle
Wm. H. Doyle
Inventor:
Winfield S. Harmon
Roscoe B. Wheeler, Atty.
N. PETERS, Photo-Lithographer, Washington, D.C.

UNITED STATES PATENT OFFICE.

WINFIELD S. HARMON, OF DETROIT, MICHIGAN.

ANTI-FRICTION BEARING FOR ROLLER-SKATES.

SPECIFICATION forming part of Letters Patent No. 320,554, dated June 23, 1885.

Application filed January 15, 1885. (No model.)

*To all whom it may concern:*

Be it known that I, WINFIELD S. HARMON, a citizen of the United States, residing at Detroit, in the county of Wayne and State of Michigan, have invented certain new and useful Improvements in Anti-Friction Bearings for Roller-Skates; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my present invention is to provide anti-friction bearings for the wheel and axle of a roller-skate, that will be durable, and easy in their movements; also to provide means for lubricating the parts by a gradual flow of oil being distributed through a hollow axle; and my present invention consists in the general construction of parts, as hereinafter set forth, and pointed out in the claims.

Figure 1 is a vertical section of my invention, the parts all in position. Figs. 2, 3, 4, 5, 6, 7, 8, and 9 are details of the same, as will be hereinafter set forth.

In Fig. 1, A represents the axle, having a hole, $b$, through the longitudinal center. Through the vertical center of the axle is a hole, O, which intercepts the hole $b$ at right angles. In the hole O the oil is inserted, and, passing through the hollow axle, is distributed into the wearing or bearing parts of the device. The wheel consists of a ring of wood or like material, as shown in Figs. 1 and 7, having the annular depressions $r\ r$ around its inner periphery.

C represents a metal cup, provided with the flange $f$. (See Fig. 5.) The opening H in the wheel W, as shown in Figs. 1 and 7, is sufficiently large to receive the body of the cup C, fitting snugly, as shown in Fig. 1, the flange $f$ of the cup fitting within the recess $r$ of the wheel. (See Fig. 1.) The bearing part of the axle A is reduced, as indicated at D.

I employ three friction-rollers, R R R, whose length is equal to that of the reduced portion D of the axle, and said rollers have a bearing upon said reduced portion, being placed at an equilateral distance from each other, and are held at such distance by means of the rings B B, which fit loosely over the axle A, with the bearings $e\ e\ e$ of the rollers supported within said rings, as shown in Figs. 1, 3, and 8. It will be observed that the rollers are first dropped into position upon the reduced portion D of the axle. The rings B B are then placed in position, as shown in Figs. 1 and 3, which holds the rollers in position, preventing any transverse movement upon the axle. The wheel W, containing the metal cup C, is then slipped over the rings B B and rollers R R R, the cup being sufficiently large to receive them, as shown in Fig. 1.

P represents a metal plate, as shown in Figs. 1 and 2. Said plate has two screw-holes, $a\ a$, (see Fig. 9,) when the wheel, its cup and rollers are in position, as shown in Fig. 1. The plate P is forced into the recess $r$ on the back face of the wheel W, as shown in Fig. 1. The screws $s\ s$ are inserted through the holes $a\ a$ of the plate and pass into corresponding holes in the edge of the cup C, as clearly shown in Fig. 1. It will thus be observed that the flange $f$ of the cup and the outer periphery of the plate P are bound firmly against and within the recesses $r\ r$ of the wheel proper, thus securing the parts rigidly together, but allowing the rollers to freely revolve around the bearing part D of the axle, and that said rollers and rings are securely confined within the metal cup C. As the wheel is revolved a suction is produced at the end of the axle, causing the oil to flow out into the cup C, thus lubricating the parts. By this arrangement I dispense with the common linchpin for holding the wheel upon the axle. As the oil flows into the cup it is prevented from passing out at the front side of the wheel, as said cup has a solid metal front, thus preventing oil from being thrown upon the garments of the skater by flowing over the front of the wheel, as is now common.

Having thus fully described my present invention, what I claim as new, and desire to secure by Letters Patent, is—

1. In combination with the metal cup C, the free end of the axle having reduced portion D, housed within said cup, also the series of rollers and rings, as specified, the plate P, attached to said cup, said cup and plate attached to the wheel W, substantially as specified.

2. The combination of the axle having oil-channels O b, as specified, and reduced bearing D, the wheel W, provided with the recesses r r, the metal cup having flange f, the series of rollers journaled within the rings B B, and the plate P, secured to said cup and wheel by screws, substantially as specified.

In testimony whereof I affix my signature in presence of two witnesses.

WINFIELD S. HARMON.

Witnesses:
HAROLD D. COOPER,
R. B. WHEELER.